(12) United States Patent
Bi et al.

(10) Patent No.: US 11,435,432 B2
(45) Date of Patent: Sep. 6, 2022

(54) TERMINAL POSITIONING METHOD AND APPARATUS, AND STORAGE MEDIUM

(71) Applicant: ZTE Corporation, Shenzhen (CN)

(72) Inventors: Cheng Bi, Shenzhen (CN); Shijun Chen, Shenzhen (CN); Wanfu Xu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/254,983

(22) PCT Filed: Aug. 21, 2019

(86) PCT No.: PCT/CN2019/101756
§ 371 (c)(1),
(2) Date: Dec. 22, 2020

(87) PCT Pub. No.: WO2020/140443
PCT Pub. Date: Jul. 9, 2020

(65) Prior Publication Data
US 2021/0270932 A1 Sep. 2, 2021

(30) Foreign Application Priority Data
Jan. 4, 2019 (CN) .......................... 201910008845.8

(51) Int. Cl.
*G01S 5/10* (2006.01)
*H04B 17/318* (2015.01)
(Continued)

(52) U.S. Cl.
CPC .............. *G01S 5/10* (2013.01); *G01S 5/0284* (2013.01); *H04B 17/318* (2015.01);
(Continued)

(58) Field of Classification Search
None
See application file for complete search history.

(56) References Cited

U.S. PATENT DOCUMENTS

2008/0009295 A1 1/2008 Brousseau
2019/0037529 A1* 1/2019 Edge ..................... H04W 16/28

FOREIGN PATENT DOCUMENTS

CN 103582116 A * 2/2014
CN 103582116 A 2/2014
(Continued)

OTHER PUBLICATIONS

International Search Report for corresponding application PCT/CN2019/101756 filed Aug. 21, 2019; dated Nov. 14, 2019.
(Continued)

*Primary Examiner* — Adolf Dsouza
(74) *Attorney, Agent, or Firm* — Cantor Colburn LLP

(57) ABSTRACT

A terminal positioning method includes: determining that there is no Line Of Sight (LOS) between a first communication node and a terminal, wherein there is a reflecting object between the first communication node and the terminal; determining first position information of the reflecting object according to a first beam of the first communication node, the first beam is a beam, detected by the terminal to have a strongest signal, among a plurality of beams of the first communication node; and determining a position of the terminal according to the first position information.

18 Claims, 3 Drawing Sheets

(51) Int. Cl.
*G01S 5/02* (2010.01)
*H04W 16/28* (2009.01)
*H04W 24/10* (2009.01)
*H04W 64/00* (2009.01)

(52) U.S. Cl.
CPC .......... *H04W 16/28* (2013.01); *H04W 24/10* (2013.01); *H04W 64/006* (2013.01)

(56) References Cited

FOREIGN PATENT DOCUMENTS

| CN | 103874190 A | 6/2014 |
| CN | 107923964 A | 4/2018 |
| WO | 2015179704 A2 | 11/2015 |
| WO | 2017164925 A1 | 9/2017 |

OTHER PUBLICATIONS

3GPP TSG RAN WGI Meeting #95, Spokane USA, Nov. 12-16, 2018, "Potential Techniques for NR Positioning", R1 1812236.
European Search Report for corresponding application EP19907517; Report dated Oct. 22, 2021.

\* cited by examiner

TERMINAL POSITIONING METHOD AND APPARATUS, AND STORAGE MEDIUM

TECHNICAL FIELD

The embodiments of the present disclosure relate to, but are not limited to, the field of communications.

BACKGROUND

Positioning is introduced into the 3GPP standards since Release 9, in which positioning reference signals (PRS) are introduced to implement downlink positioning. A typical positioning method is Observed Time Difference of Arrival (OTDOA) positioning. Generally, a receiving node needs to measure downlink signals sent from one or more communication nodes, and the measurement results are further used to calculate the positions. Non-line of sight (NLOS) is always a very important source of error in the OTDOA positioning, and this problem has not been effectively solved yet.

With the development of the era, the requirements on the accuracy of positioning services are becoming higher and higher in various industries. Due to inherent defects, signals based on a global navigation satellite system (GNSS) cannot satisfy a high-accuracy positioning requirement in a scenario in which no satellite signal can be received (this situation is common in indoor scenarios), and therefore, positioning based on a communication network is still irreplaceable.

For the problems in the related art that positioning errors brought by NLOS cannot be corrected, no effective technical solution has been proposed.

SUMMARY

The embodiments of the present disclosure provide a terminal positioning method and apparatus, and a storage medium.

According to an embodiment of the present disclosure, provided is a terminal positioning method, including: determining that there is no Line Of Sight (LOS) between a first communication node and a terminal, wherein there is a reflecting object between the first communication node and the terminal; determining first position information of the reflecting object according to a first beam of the first communication node, wherein the first beam is a beam, detected by the terminal to have a strongest signal, among a plurality of beams of the first communication node; and determining a position of the terminal according to the first position information.

According to another embodiment of the present disclosure, further provided is a terminal positioning apparatus, including: a first determination module, configured to determine that there is no LOS between a first communication node and a terminal, wherein there is a reflecting object between the first communication node and the terminal; a second determination module, configured to determine first position information of the reflecting object according to a first beam of the first communication node, wherein the first beam is a beam, detected by the terminal to have a strongest signal, among a plurality of beams of the first communication node; and a third determination module, configured to determine a position of the terminal according to the first position information.

According to another embodiment of the present disclosure, further provided is a storage medium, in which a computer program is stored, wherein the computer program is configured to execute the terminal positioning method according to any one of the method embodiments at runtime.

BRIEF DESCRIPTION OF THE DRAWINGS

The drawings illustrated herein, constituting a part of the present application, are used for providing deeper understanding of the present disclosure, and the illustrative embodiment and illustrations thereof are used for explaining the present disclosure, rather than constitute inappropriate limitation on the present disclosure.

DETAILED DESCRIPTION OF THE EMBODIMENTS

The present disclosure will be described in details below with reference to the accompanying drawings and embodiments. It should be noted that the embodiments and the features of embodiments of the present disclosure can be combined if no conflict is caused.

It should be noted that, terms such as "first" and "second" in the description, claims and accompanying drawings of the present disclosure are used to distinguish similar objects, but are not necessarily used to describe a specific sequence or order.

The $5^{th}$ Generation (5G) uses, in key technologies, a new coding method, beamforming, a large-scale antenna array, a millimeter wave spectrum, etc., has a large bandwidth, facilitates parameter estimation, provides support for high-precision distance measurement, and introduces the large-scale antenna technology. A base station can be equipped with 128 antenna units to provide a foundation for high-precision angle measurement. 5G will realize dense networking, significantly improving the density of base stations. Therefore, a user signal can be received by a plurality of base stations at the same time, which is beneficial to the realization of high-precision positioning with the help of the cooperation among multiple base stations.

With regard to the current standard SI progress, almost all participants consider that sending a positioning reference signal in a beam polling mode should be supported (by multiplexing an existing signal) and a gain brought by uplink and downlink angles to positioning should be studied. There is a narrow-beam high-precision angle measurement method in 5 G, which provides a possibility for recognizing Non-Line Of Sight (NLOS). The following technical solutions are provided in the following embodiments of the present disclosure for this implementation.

Figure 1:
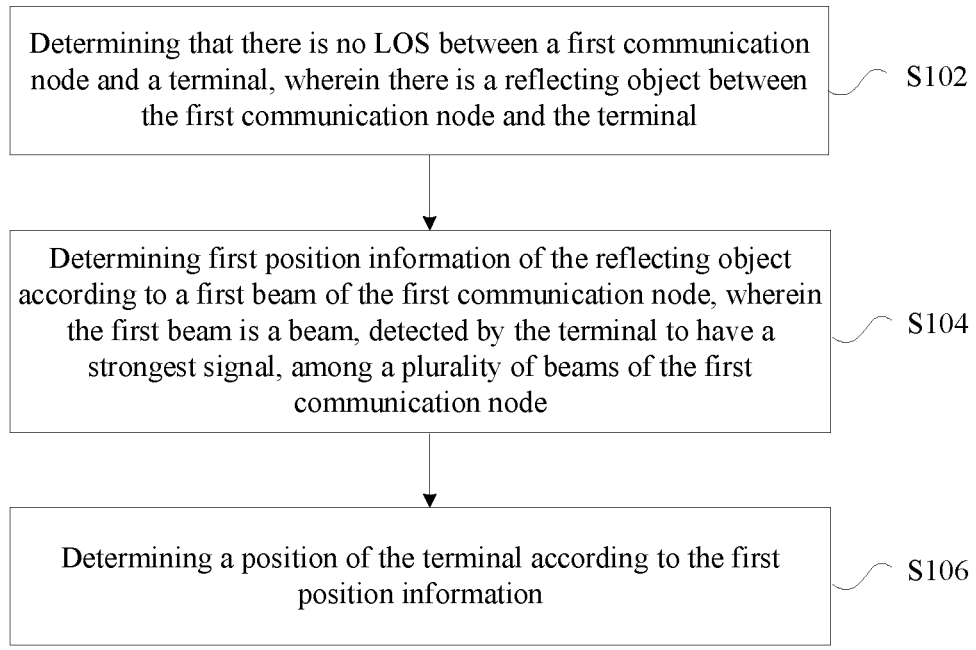
FIG. 1 is a flowchart of a terminal positioning method according to an embodiment of the present disclosure.

An embodiment of the present disclosure provides a terminal positioning method. FIG. 1 is a flowchart of a terminal positioning method according to an embodiment of the present disclosure. As shown in FIG. 1, the method includes operation S102, operation S104 and operation S106.

In operation S102, it is determined that there is no Line Of Sight (LOS) between a first communication node and a terminal, wherein there is a reflecting object between the first communication node and the terminal.

In operation S104, first position information of the reflecting object is determined according to a first beam of the first communication node, wherein the first beam is a beam, detected by the terminal to have a strongest signal, among a plurality of beams of the first communication node.

In operation S106, a position of the terminal is determined according to the first position information.

According to the above operations, the first position information of the reflecting object between the first communication node and the terminal is determined according to a first beam of the first communication node, wherein the first beam is a beam, detected by the terminal to have the strongest signal, among a plurality of beams of the first communication node; and, the position of the terminal is determined according to the first position information. By means of the above technical solution, the problems in the related art that positioning errors brought by NLOS cannot be corrected are at least solved, thereby correcting the positioning errors caused by the NLOS, and improving the precision of positioning for the terminal.

It should be noted that, the first communication node in the embodiment of the present disclosure refers to a node sending a positioning reference signal.

The terminal accesses a plurality of communication nodes, and the plurality of communication nodes include the first communication node. Before determining that there is no LOS between the first communication node and the terminal, the method may further include the following operation. For each of the plurality of communication nodes, whether there is an LOS between the terminal and each of the plurality of communication nodes is determined according to an included angle between a beam direction of each of the plurality of communication nodes and a first direction, wherein the beam direction of each of the plurality of communication nodes is a beam direction of a beam, detected by the terminal to have the strongest signal, among a plurality of beams of each of the plurality of communication nodes, and the first direction is a connection direction between the terminal and each of the plurality of communication nodes.

In an embodiment of the present disclosure, whether there is an LOS between the terminal and each of the plurality of communication nodes may be determined according to the included angle between the beam direction of each of the plurality of communication nodes and the first direction in the following implementation manner. When the included angle is less than a preset threshold, it is determined that there is an LOS between the terminal and each of the plurality of communication nodes. When the included angle is greater than or equal to the preset threshold, it is determined that there is no LOS between the terminal and each of the plurality of communication nodes.

In an embodiment of the present disclosure, the preset threshold may be configured by a positioning server according to a requirement of a positioning service. The method may further include the following operations. The preset threshold is added to auxiliary information, and the auxiliary information is sent to the terminal via an interface between the positioning server and the terminal (e.g., User Equipment (UE)).

There are multiple implementations for the operation S104. In an exemplary embodiment, the operation S104 may be implemented by the following technical solution. Parameter information, which includes angle of departure (AOD) information or zenith of departure (ZOD) information of the first beam, a first initial position of the terminal, and time difference information, is acquired, wherein the time difference information includes a time difference between a first time, which is required for a beam of the first communication node having no LOS to reach the terminal, and a second time, which is required for a beam of a second communication node having an LOS to reach the terminal. The first position information of the reflecting object is determined according to the parameter information.

In an embodiment of the present disclosure, the AOD information or the ZOD information may be carried in a following manner. The AOD information or the ZOD information may be carried in information sent from the first communication node to a positioning server, for example, the AOD information or the ZOD information may be carried in OTDOA cell information in an interface between the first communication node and the positioning server. The AOD information or the ZOD information may be then carried in auxiliary information sent from the positioning server to the terminal, for example, the auxiliary information may be added in an interface between the terminal and the positioning server. In some exemplary implementation, the AOD information or the ZOD information may be an included angle between the first beam and a plane where an X axis and a Z axis of a unified three-dimensional coordinate system are located. In some embodiments, the X axis and the Y axis of the three-dimensional coordinate system are perpendicular to each other, and are both parallel to a horizontal direction (such as the ground), while the Z axis is perpendicular to the ground, for example, the origin point O of the Z axis may be a position where the ground is located.

In an embodiment of the present disclosure, the first initial position of the terminal may be acquired at least in a following manner. A positioning reference signal is sent in a beam polling mode, so as to acquire the first initial position of the terminal.

In an embodiment of the present disclosure, after determining the first position information of the reflecting object according to the parameter information, the method may further include an operation that a second initial position of the terminal is determined based on the first position information by means of OTDOA positioning.

In an embodiment of the present disclosure, after determining the second initial position of the terminal based on the first position information by means of the OTDOA positioning, the method may further include an operation that second position information of the reflecting object is determined according to the second initial position, the AOD information or the ZOD information, and the time difference information.

In an embodiment of the present disclosure, after determining second position information of the reflecting object, the method may further include the following operations. The second position information is carried in auxiliary information, and the auxiliary information is sent to the terminal via an interface between a positioning server and the terminal.

In an embodiment of the present disclosure, after determining the position of the terminal according to the first position information, the method may further include the following operation. Position information of the reflecting object reported by the terminal is received, wherein the position information of the reflecting object is a position of the reflecting object (i.e. the position of the reflecting object reflecting the first beam) corresponding to a first beam corresponding to the terminal and sent in an interface between the terminal and a positioning server in a process that the terminal reports positioning information.

The operation S106 may be implemented by the following technical solution. The position of the terminal is determined based on the first position information by means of OTDOA positioning, wherein a position of the reflecting object indicated by the first position information serves as a position of a sending node of the OTDOA positioning.

Based on the description of the above embodiments, a person skilled in the art can clearly understand that the method according to the described embodiments may be implemented by means of software in connection with the required general-purpose hardware platform, and of course, can also be implemented by hardware, but in many cases the former is a more preferred implementation. Based on this understanding, the essence of the technical solutions in the embodiments of the present disclosure or the contributions to current technical solutions may be implemented in the form of software products. Such software product may be stored in a computer storage medium (such as a ROM/RAM, a magnetic disk, or an optical disk) and include one or more computer-readable instructions which enables a device (such as a cell phone, a personal computer, a server, or a network device) to implement the methods in the embodiments of the present disclosure.

An embodiment of the present disclosure provides a terminal positioning apparatus, configured to implement the methods of the embodiments. The content that has been described will not be repeated here. As used below, the term "module" is a combination of software and/or hardware that can implement a predetermined function. Although the apparatus described in the following embodiments is preferably implemented by software, implementation of hardware or a combination of software and hardware is also possible and conceivable.

Figure 2:
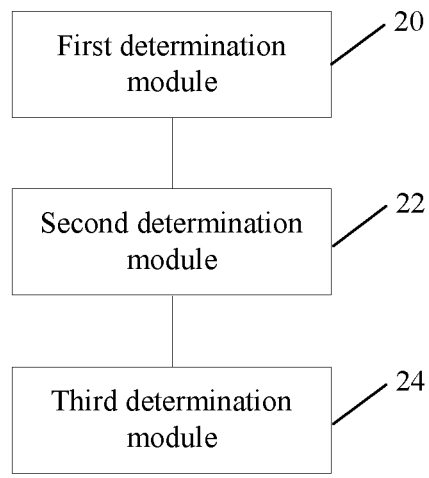
FIG. 2 is a structural diagram of a terminal positioning apparatus according to an embodiment of the present disclosure.

FIG. 2 is a structural diagram of a terminal positioning apparatus according to an embodiment of the present disclosure. As shown in FIG. 2, the apparatus includes a first determination module 20, a second determination module 22 and a third determination module 24.

The first determination module 20 is configured to determine that there is no LOS between a first communication node and a terminal, wherein there is a reflecting object between the first communication node and the terminal.

The second determination module 22 is configured to determine first position information of the reflecting object according to a first beam of the first communication node, wherein the first beam is a beam, detected by the terminal to have a strongest signal, among a plurality of beams of the first communication node.

The third determination module 24 is configured to determine a position of the terminal according to the first position information.

According to the embodiment of the present disclosure, the first position information of the reflecting object between the first communication node and the terminal is determined according to a first beam of the first communication node, wherein the first beam is a beam, detected by the terminal to have the strongest signal, among a plurality of beams of the first communication node; and the position of the terminal is determined according to the first position information. By means of the described technical solution, the problems in the related art that positioning errors brought by NLOS cannot be corrected are at least solved, thereby correcting the positioning errors caused by the NLOS, and improving the precision of positioning for the terminal.

In an embodiment of the present disclosure, the second determination module 22 is further configured to acquire the following parameter information: AOD information or ZOD information of the first beam, a first initial position of the terminal, and time difference information, wherein the time difference information includes a time difference between a first time, which is required for a beam of the first communication node having no LOS to reach the terminal, and a second time, which is required for a beam of a second communication node having an LOS to reach the terminal; and determine the first position information of the reflecting object according to the parameter information.

The AOD information or the ZOD information may be carried in one of the following manners. The AOD information or the ZOD information may be carried in information sent from the first communication node to a positioning server, for example, the AOD information or the ZOD information may be carried in OTDOA cell information in an interface between the first communication node and the positioning server. The AOD information or the ZOD information may be then carried in auxiliary information sent from the positioning server to the terminal, for example, the auxiliary information may be added in an interface between the terminal and the positioning server. In some exemplary implementation, the AOD information or the ZOD information may be an included angle between the first beam and a plane where an X axis and a Z axis are located in a unified three-dimensional coordinate system.

It should be noted that, the first communication node in the embodiment of the present disclosure refers to a node sending a positioning reference signal.

The terminal accesses a plurality of communication nodes, and the plurality of communication nodes include the first communication node. The first determination module 20 may be further configured to determine, for each of the plurality of communication nodes and according to an included angle between a beam direction of each of the plurality of communication nodes and a first direction, whether there is an LOS between the terminal and each of the plurality of communication nodes, wherein the beam direction of each of the plurality of communication nodes is a beam direction of a beam, detected by the terminal to have the strongest signal, among a plurality of beams of each of the plurality of communication nodes, and the first direction is a connection direction between the terminal and each of the plurality of communication nodes.

In an embodiment of the present disclosure, whether there is an LOS between the terminal and each of the plurality of communication nodes may be determined according to an included angle between a beam direction of each of the plurality of communication nodes and a first direction in the following implementation manner. The first determination module 20 may be further configured to determine, when the included angle is greater than or equal to the preset threshold, that there is no LOS between the terminal and each of the plurality of communication nodes, and determine, when the included angle is greater than or equal to the preset threshold, that there is no LOS between the terminal and each of the plurality of communication nodes.

In an embodiment of the present disclosure, the preset threshold may be configured by a positioning server according to a requirement of a positioning service. The positioning server may be further configured to add the preset threshold to auxiliary information, and send the auxiliary information to the terminal via an interface between the positioning server and the terminal.

In an embodiment of the present disclosure, the first determination module 20 may be further configured to send a positioning reference signal in a beam polling mode, so as to acquire the first initial position of the terminal.

In an embodiment of the present disclosure, the third determination module 24 may be further configured to determine a second initial position of the terminal based on the first position information by means of OTDOA positioning.

In an embodiment of the present disclosure, the third determination module 24 may be further configured to determine second position information of the reflecting object according to the second initial position, the AOD information or the ZOD information, and the time difference information.

In an embodiment of the present disclosure, the third determination module 24 may be further configured to carry the second position information in auxiliary information, and send the auxiliary information to the terminal via an interface between a positioning server and the terminal.

In an embodiment of the present disclosure, the third determination module 24 may be further configured to receive position information of the reflecting object reported by the terminal, wherein the position information of the reflecting object is a position of the reflecting object corresponding to a first beam corresponding to the terminal and sent in an interface between the terminal and a positioning server in a process that the terminal reports positioning information.

In an embodiment of the present disclosure, the third determination module 24 may be further configured to determine the position of the terminal based on the first position information by means of OTDOA positioning, wherein the position of the reflecting object indicated by the first position information serves as the position of a sending node of the OTDOA positioning.

It should be noted that the technical solutions of the embodiments above may be used in combination or individually, and the present disclosure will not be limited to the embodiments.

The technical solutions will be described below with reference to the embodiments, but are not intended to limit the technical solutions of the embodiments of the present disclosure.

An embodiment of the present disclosure provides a high-precision positioning method, including operation 1 to operation 8 as below.

In operation 1, a Positioning Reference Signal (PRS) is sent in a beam polling mode. The beam numbers of the beams through which each communication node sends the positioning reference signal are denoted as $0-prsbeam_{max}$. The AOD/ZOD information of a PRS beam is added into information sent by the communication node to a positioning server, and the AOD/ZOD information of the PRS beam is added into auxiliary information sent by the positioning server to UE.

In an embodiment of the present disclosure, the AOD/ZOD information of the PRS beam is defined as the included angle between the direction of the transmission beam having the strongest energy and the plane where the X axis and the Z axis in the unified three-dimensional coordinate system are located.

In an embodiment of the present disclosure, the auxiliary information sent by the positioning server to the UE is added to the interface between the UE and the positioning server, and may be added to the OTDOA auxiliary information to be sent together with the OTDOA auxiliary information, and may also be added to a new independent variable set.

In an embodiment of the present disclosure, the AOD/ZOD information of the PRS beam sent by the communication node to the positioning server is added to the OTDOA communication node information (OTDOA cell information) in the interface between the positioning server and the communication node.

In operation 2, in a case where a positioning reference signal is sent in a beam polling mode, initial basic OTDOA positioning is completed to acquire an initial basic positioning result $X_U[1]$ of UE (equivalent to the first initial position in the embodiments above).

In an embodiment of the present disclosure, at moment k, a UE side (UE-based mode) or a positioning server (UE-assisted mode) performs LOS verification according to the AOD/ZOD information corresponding to the beam ID used by the UE for OTDOA positioning, geographical coordinate information of the communication node (signal sending node), and a current OTDOA positioning result $X_U[k]$ (i.e. the terminal position at moment k).

In an embodiment of the present disclosure, the beam used by OTDOA positioning is a beam selected by the UE among all the received beams, for example, the UE may select a beam having the strongest signal.

In an embodiment of the present disclosure, in the LOS verification, if the direction to which the beam of a certain communication node detected by the UE geographically points (i.e., the pointing direction of the beam) is consistent with the current positioning result of the UE, then it is considered that there is an LOS between the communication node and the UE.

In an embodiment of the present disclosure, that the pointing direction being consistent with the current positioning result of the UE means that an error of an angle between a direction of a line connecting the UE and the corresponding communication node and a direction of the corresponding beam is within a threshold.

In an embodiment of the present disclosure, the threshold is configured by the positioning server according to the requirement of the positioning service, and is sent as auxiliary information to the UE via an interface between the positioning server and the UE.

In an embodiment of the present disclosure, if the direction to which the beam of a certain communication node detected by the UE geographically points is inconsistent with the current positioning result of the UE, that is, the error of the above angle exceeds a threshold, it is considered that there is no LOS between the communication node and the UE.

In an embodiment of the present disclosure, in the initial phase of the algorithm, it is required that the UE in the current position is required to have an LOS with at least one detected communication node, which is recorded as a communication node $n_0$.

In operation 3, the communication node having no LOS with the UE is denoted as communication node $n_i$, the time difference of arrival between the beams from the communication node $n_i$ and the communication node $n_0$ acquired by means of measurement is $\tau_i - \tau_0 = \tau_{0i}$, the previously calculated UE position is $X_U[k]$, the geographical positions of the communication node $n_0$ and the communication node $n_i$ are known, and the $AOD^{\theta_{ni,j}^{AOD}}/ZOD^{\theta_{ni,j}^{ZOD}}$ of the beam j ($0 \leq j \leq prsbeam_{max}$) of each of the communication nodes can be acquired through detection. Assuming that the beam only passes one reflecting object before reaching the UE, and each beam of the communication node corresponds to its own independent reflecting object, the position $\hat{X}_{ni,j}^R[k]$ of the reflecting object corresponding to the beam can be acquired, and thus, the distance $\hat{d}_{ni,j}^{BR}[k]$ from the reflecting object to the communication node (base station) at the current moment can be acquired. The distances for different moments from the starting moment to the current moment k are averaged $$\tilde{d}_{ni,j}^{BR}[k] = \frac{1}{k}\sum_{t=1}^{k} \hat{d}_{ni,j}^{BR}[t],$$

and further, the position of the reflecting object can be updated as $X_U + \tilde{d}_{ni,j}^{BR}[k](\cos\theta_{ni,j}^{AOD} \sin\theta_{ni,j}^{AOD}, \tan\theta_{ni,j}^{ZOD})$ according to ZOD/AOD information, wherein i, k, $X_U[k]$, $AOD_{ni,j}^{AOD}$, $ZOD^{\theta_{ni,j}^{ZOD}}$, $\hat{X}_{ni,j}^{R}[k]$ and $\hat{d}_{ni,j}^{BR}[k]$ are all greater than 0.

In operation 4, the updated position of the reflecting object is substituted into the formula, and the new position $X_{U[k+1]}$ of the UE is solved again by means of the OTDOA algorithm.

In an embodiment of the present disclosure, in the process of performing the OTDOA calculation again, the position of the reflecting object is substituted into the calculation as the known information, and the reflecting object can be deemed as a sending node of the OTDOA positioning, and there is LOS from the reflecting object to the UE (in cases where the UE does not switch the detected beam).

In operation 5, the position acquired in the operation 4 is substituted into the operation 2 for repeated execution.

In an embodiment of the present disclosure, the repeated execution means that $X_U[k+1]$ and the AOD/ZOD information of the beam are substituted into the formula to re-calculate the position $\hat{X}_{ni,j}^{R}[k+1]$ of the reflecting object.

In operation 6, when the movement of the UE results in the change of the strongest beam from a certain communication node detected by the UE, or the change of the communication node, the processes above are repeated.

In operation 7, when the calculation of the position of the reflecting object is performed at the UE side (UE-based mode), the UE needs to send a position of the reflecting object, which is obtained through the calculation of the terminal and is corresponding to a corresponding beam of the corresponding communication node, in an interface between the terminal and a positioning server in a process that the terminal reports positioning information. When the calculation of the position of the reflecting object is performed at a position server (UE-assisted mode), the position server stores the data, and continuously update, with the update of the data and in combination with the positioning data, the position of the reflecting object corresponding to the beam of the corresponding communication node.

In operation 8, the stable position of the reflecting object can be calculated and sent to the UE as auxiliary information via an interface between the positioning server and the UE.

By means of the technical solution, an OTDOA algorithm is used to calculate a positioning result, and a positioning reference signal is sent in a beam polling mode. In the technical solution, a beam ID is used, and an assumed position of the reflecting object is introduced.

In addition, the technical solution above can judge the existence of LOS based on a downlink narrow beam, and further introduces the concept of AOD/ZOD information of a beam. The technical solution uses the features of a narrow beam to estimate a corresponding position of the reflecting object, substitutes the position of the reflecting object into the formula to calculate the UE position again by means of the OTDOA algorithm, and performs iteration continuously. In addition, the configuration information and auxiliary information sending process related to the technical solutions of the embodiments of the present disclosure is further added, and the storage function and the function of continually optimizing the position of the reflecting object are added to the positioning server.

By means of the technical solution of the embodiments of the present disclosure, additional feedback is not needed, and the effect of effectively determining and correcting an NLOS scenario is achieved, improving the positioning accuracy, and overcoming the problem and defect that the positioning errors caused by the NLOS cannot be corrected.

Figure 3:
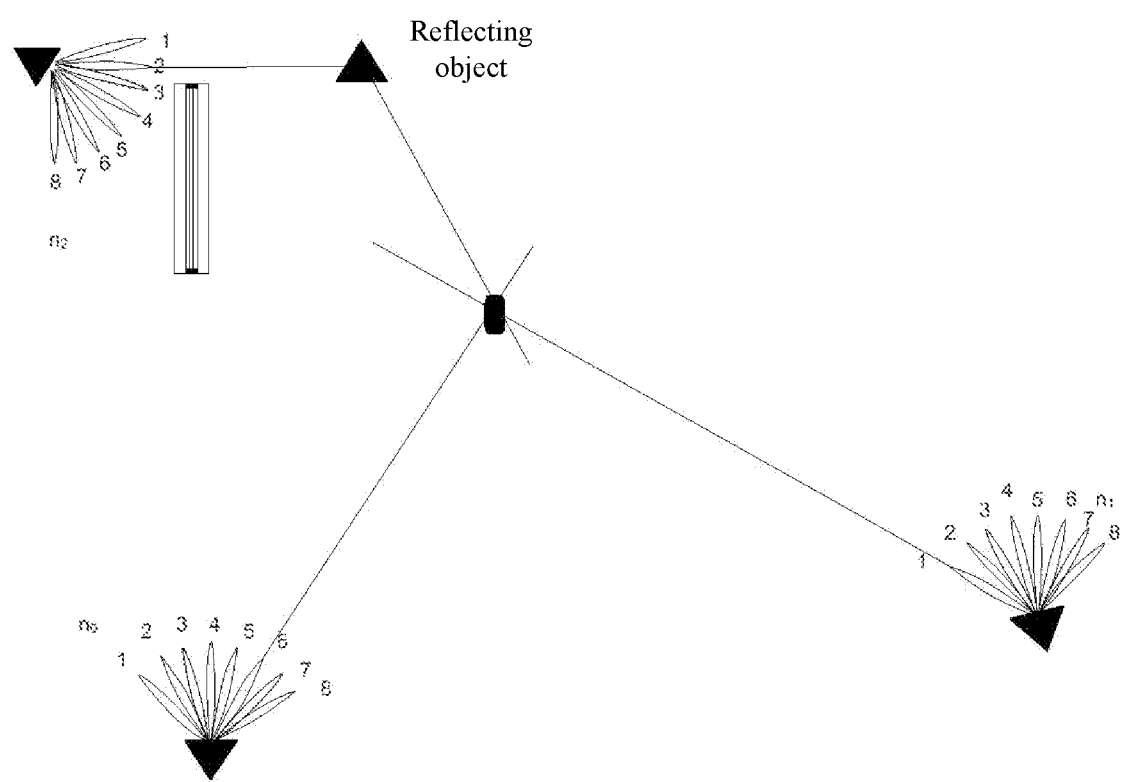
FIG. 3 is a schematic diagram of the existence of an LOS according to an embodiment of the present disclosure.

In an embodiment of the present disclosure, a two-dimensional position of the UE can be determined, and positioning result is output once every is according to the positioning service request. As shown in FIG. 3, it is assumed that the UE in the current position can detect that the PRS beam 6 from the base station (communication node) $n_0$ has the strongest signal, the PRS beam 1 from the base station $n_1$ has the strongest signal, and the PRS beam 2 from the base station $n_2$ has the strongest signal. The base station $n_0$ is taken as a reference base station, the differences between a time when the signal of the reference base station reaches the UE and a time when the signals of the other two base stations reach the UE are respectively $\tau_{01}$ and $\tau_{02}$ and the coordinates of the three base stations in the unified coordinate system are respectively $(x_{b0}, y_{b0})$, $(x_{b1}, y_{b1})$, $(x_{b2}, y_{b2})$, wherein the z coordinate may be considered as 0. The position $X_U[l]$ of the UE may be acquired by means of the OTDOA algorithm according to the time difference of arrival and the time difference of beam transmission. However, the beam of the base station $n_2$ is NLOS, and is reflected by a reflecting object before reaching the UE, resulting in an inaccuracy OTDOA positioning result. After one positioning is completed in a UE-based mode, the LOS verification is performed. Specifically, when an included angle $\alpha_{un1,l}[k]$ between the connection line between $X_U[l]$ and $n_1$ and the beam 1 of $n_1$ is less than a set threshold $\alpha_{thresh}$, it is considered that there is an LOS between $n_1$ and the UE, and it is unnecessary to solve a reflecting object for correction. The beam 6 from $n_0$ is subjected to the same LOS verification and is determined have an LOS, and for the base station $n_2$, it is verified that the included angle $\alpha_{un2,2}[k]$ between the connection line between $X_U[l]$ and $n_2$ and the beam 2 of $n_2$ is greater than a set threshold. According to the relationship between the position of the reflecting object and the AOD of beam 2 of $n_2$, the position of the reflecting object is set as $(x_{Rn2,2}, X_{Rn2,2} \tan\theta_{n2AOD,2})[k]$. According to $X_U[l]$, $(x_{b0}, y_{b0})$, $\theta_{n2AOD,2}$, $(x_{b2}, y_{b2})$ and $\tau_{01}$, the equation can be derived: $|\hat{X}_{n2,R}^{(2)}[k]-(x_{b2}, y_{b2})|+|\hat{X}_{n2,R}^{(2)}[k]-X_U[1]|-|X_U[1]-(x_{b0}, y_{b0})|=c\times\tau_{02}$, and then the current position $\hat{X}_{n2,R}^{2}[k]$ of the reflecting object corresponding to the beam 2 of the base station $n_2$ can be acquired by solving the equation. Accordingly, the distance $\hat{d}_{n2,2}^{BR}[t]$ from the reflecting object to the base station can be calculated, and the distances acquired before the current time are averaged to acquire $$\tilde{d}_{n2,2}^{BR}[k] = \frac{1}{k}\sum_{t=1}^{k}\hat{d}_{n2,2}^{BR}[t],$$

which serves as the updated position of the reflecting object corresponding to the beam. The updated position of the reflecting object is taken as a known quantity, it is assumed that the beam is subjected to only one reflection, the OTDOA positioning result is calculated again, in this process, for a base station known as NLOS, the position of the reflecting object can be considered to be the position of a reflection node, the difference time of arrival between the reflection node and the base station $n_0$ is $\tau_{02}-(\|\hat{X}_{n2,R}^{(2)}[k]-X_U[1]\|)/c$, and $X_U[k+1]$ can be calculated by substituting this difference time of arrival, where c is the speed of light.

Figure 4:
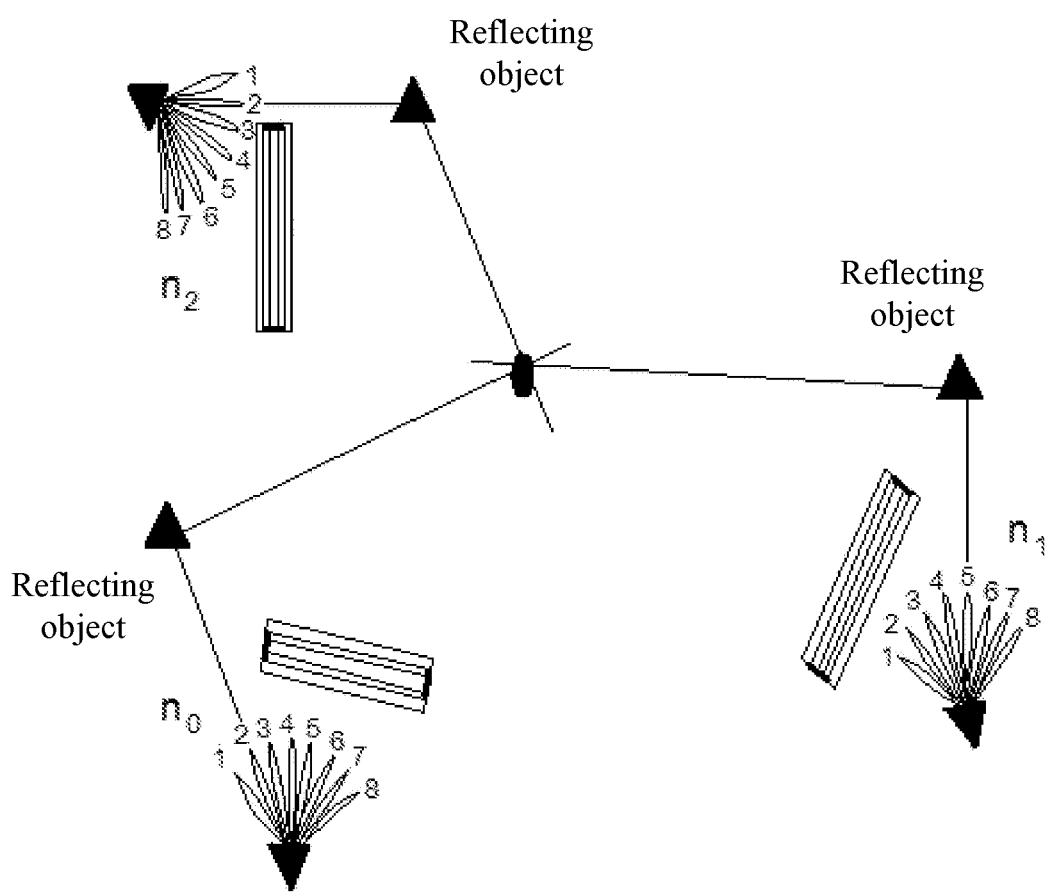
FIG. 4 is a schematic diagram of an absence of an LOS according to an embodiment of the present disclosure.

In an embodiment of the present disclosure, a two-dimensional position of the UE can be determined, and positioning result is output once every is according to the positioning service request. As shown in FIG. 4, it is assumed that the UE in the current position can detect that the PRS beam 2 from the base station (communication node) $n_0$ has the strongest signal, the PRS beam 5 from the base station $n_1$ has the strongest signal, and the PRS beam 2 from the base station $n_2$ has the strongest signal. The base station $n_0$ is taken as a reference base station, the differences between a time when the signal of the reference base station reaches the UE and a time when the beams of the other two base stations reach the UE are respectively $\tau_{01}$ and $\tau_{02}$ and the coordinates of the three base stations in the unified coordinate system are respectively $(x_{b0}, y_{b0})$, $(x_{b1}, y_{b1})$, $(x_{b2}, y_{b2})$, wherein the z coordinate may be considered as 0. The position $X_U[1]$ of the UE may be acquired by means of the OTDOA algorithm according to the time difference of arrival and the time difference of beam transmission. It is discovered after LOS verification that errors between the positions initially calculated by the UE and beam directions of the three base stations all exceed a threshold, and therefore it is determined that the three base stations all have NLOS. If the reflecting object, calculated by the positioning server, corresponding to the beam 2 from the base station $n_0$ is stable, and the distance from the reflecting object to the base station is less than the currently calculated distance from the UE to the base station, the positioning server may substitute the position of the reflecting object as a known quantity for calculation. For the specific method, reference may be made to the technical solutions of the embodiments above, which is not repeated in this embodiment, where c refers to the speed of light.

An embodiment of the present disclosure further provides a storage medium, in which a computer program is stored, wherein the computer program is configured to execute the method according to any one of preceding embodiments at runtime.

In exemplary implementations of the present embodiment, the storage medium may be configured to store program codes for executing the following operations S1 to S3.

In S1, it is determined that there is no LOS between a first communication node and a terminal, wherein there is a reflecting object between the first communication node and the terminal.

In S2, first position information of the reflecting object is determined according to a first beam of the first communication node, wherein the first beam is a beam, detected by the terminal to have a strongest signal, among a plurality of beams of the first communication node.

In S3, a position of the terminal is determined according to the first position information.

In exemplary implementations of this embodiment, the storage medium may include, but is not limited to, various media capable of storing program codes, such as a USB flash disk, a Read-Only Memory (ROM), a Random Access Memory (RAM), a removable hard disk, a magnetic disk, and an optical disk.

Optionally, for specific examples in this embodiment, reference may be made to the examples described in the foregoing embodiments and exemplary implementations, and details are not repeatedly described herein in this embodiment.

Obviously, those skilled in the art should understand that, the various modules or various operations of the present disclosure can be implemented by means of a general-purpose computing device, can be concentrated on a single computing device or distributed on a network consisting of a plurality of computing devices. Optionally, the various modules or various operations can be implemented by means of program codes executable by a computing device, and thus can be stored in a storage device and executed by a computing device. Furthermore, in some cases, the shown or described operations may be executed in an order different from that described here, or the various modules or various operations can be implemented by manufacturing the modules or operations into various integrated circuit modules respectively, or manufacturing multiple modules or operations in the modules or operations into a single integrated circuit module. As such, the present disclosure is not limited to any particular hardware and software combination.

The embodiments above are intended to illustrate but not limit the present disclosure. To those skilled in the art, various modifications and variations may be available for the present disclosure. Any modification, equivalent substitution, and improvement within the principle of the present disclosure should be covered in the scope of protection of the present disclosure.

What is claimed is:

1. A terminal positioning method, comprising:
   determining that there is no Line Of Sight (LOS) between a first communication node and a terminal, wherein there is a reflecting object between the first communication node and the terminal;
   determining first position information of the reflecting object according to a first beam of the first communication node, wherein the first beam is a beam, detected by the terminal to have a strongest signal, among a plurality of beams of the first communication node; and
   determining a position of the terminal according to the first position information, wherein determining the first position information of the reflecting object according to the first beam of the first communication node comprises:
   acquiring the following parameter information: Angle Of Departure (AOD) information or Zenith Of Departure (ZOD) information of the first beam, a first initial position of the terminal, and time difference information, wherein the time difference information comprises a time difference between a first time, which is required for a beam of the first communication node having no LOS to reach the terminal, and a second time, which is required for a beam of a second communication node having an LOS to reach the terminal; and
   determining the first position information of the reflecting object according to the parameter information.

2. The method as claimed in claim 1, wherein the terminal accesses a plurality of communication nodes, the plurality of communication nodes comprise the first communication node, and before determining that there is no LOS between the first communication node and the terminal, the method further comprises:
   for each of the plurality of communication nodes, determining, according to an included angle between a beam direction of each of the plurality of communication nodes and a first direction, whether there is an LOS between the terminal and each of the plurality of communication nodes, wherein the beam direction of each of the plurality of communication nodes is a beam direction of a beam, detected by the terminal to have the strongest signal, among a plurality of beams of each of the plurality of communication nodes, and the first direction is a connection direction between the terminal and each of the plurality of communication nodes.

3. The method as claimed in claim 2, wherein determining, according to the included angle between the beam direction of each of the plurality of communication nodes and the first direction, whether there is an LOS between the terminal and each of the plurality of communication nodes comprises:

when the included angle is less than a preset threshold, determining that there is an LOS between the terminal and each of the plurality of communication nodes; and when the included angle is greater than or equal to the preset threshold, determining that there is no LOS between the terminal and each of the plurality of communication nodes.

4. The method as claimed in claim 3, wherein the preset threshold is configured by a positioning server according to a requirement of a positioning service; the method further comprises adding the preset threshold to auxiliary information, and sending the auxiliary information to the terminal via an interface between the positioning server and the terminal.

5. The method as claimed in claim 1, wherein the AOD information or the ZOD information is carried in a following manner:

carrying the AOD information or the ZOD information in information sent from the first communication node to a positioning server, and then carrying the AOD information or the ZOD information in auxiliary information sent from the positioning server to the terminal.

6. The method as claimed in claim 5, wherein the AOD information or the ZOD information is carried in Observed Time Difference Of Arrival (OTDOA) cell information in an interface between the first communication node and the positioning server.

7. The method as claimed in claim 5, wherein the auxiliary information is added in an interface between the terminal and the positioning server.

8. The method as claimed in claim 1, wherein the first initial position of the terminal is acquired at least in a following manner:

sending a positioning reference signal in a beam polling mode, so as to acquire the first initial position of the terminal.

9. The method as claimed in claim 1, wherein after determining the first position information of the reflecting object according to the parameter information, the method further comprises:

determining a second initial position of the terminal based on the first position information by means of OTDOA positioning.

10. The method as claimed in claim 9, wherein after determining the second initial position of the terminal based on the first position information by means of the OTDOA positioning, the method further comprises:

determining second position information of the reflecting object according to the second initial position, the AOD information or the ZOD information, and the time difference information.

11. The method as claimed in claim 10, wherein after determining the second position information of the reflecting object, the method further comprises:

carrying the second position information in auxiliary information, and sending the auxiliary information to the terminal via an interface between a positioning server and the terminal.

12. The method as claimed in claim 1, wherein after determining the position of the terminal according to the first position information, the method further comprises:

receiving position information of the reflecting object reported by the terminal, wherein the position information of the reflecting object is a position of the reflecting object corresponding to a first beam corresponding to the terminal and sent in an interface between the terminal and a positioning server in a process that the terminal reports positioning information.

13. The method as claimed in claim 1, wherein determining the position of the terminal according to the first position information comprises:

determining the position of the terminal based on the first position information by means of OTDOA positioning, wherein a position of the reflecting object indicated by the first position information serves as a position of a sending node of the OTDOA positioning.

14. A non-transitory tangible storage medium, in which a computer program is stored, wherein the computer program is configured to execute the method as claimed in claim 1 at runtime.

15. A terminal positioning apparatus, comprising:

a first determination module, configured to determine that there is no Line Of Sight (LOS) between a first communication node and a terminal, wherein there is a reflecting object between the first communication node and the terminal;

a second determination module, configured to determine first position information of the reflecting object according to a first beam of the first communication node, wherein the first beam is a beam, detected by the terminal to have a strongest signal, among a plurality of beams of the first communication node; and a third determination module, configured to determine a position of the terminal according to the first position information, wherein the second determination module is further configured to:

acquire the following parameter information: Angle Of Departure (AOD) information or Zenith Of Departure (ZOD) information of the first beam, a first initial position of the terminal, and time difference information, wherein the time difference information is a time difference between a first time, which is required for a beam of the first communication node having no LOS to reach the terminal, and a second time, which is required for a beam of a second communication node having an LOS to reach the terminal; and determine the first position information of the reflecting object according to the parameter information.

16. The apparatus as claimed in claim 15, wherein the terminal accesses a plurality of communication nodes, and the plurality of communication nodes comprise the first communication node; and the first determination module is further configured to, determine, for each of the plurality of communication nodes and according to an included angle between a beam direction of each of the plurality of communication nodes and a first direction, whether there is an LOS between the terminal and each of the plurality of communication nodes, wherein the beam direction of each of the plurality of communication nodes is a beam direction of a beam, detected by the terminal to have the strongest signal, among a plurality of beams of each of the plurality of communication nodes, and the first direction is a connection direction between the terminal and each of the plurality of communication nodes.

17. The apparatus as claimed in claim 16, wherein
the first determination module is further configured to determine, when the included angle is greater than or equal to the preset threshold, that there is no LOS between the terminal and each of the plurality of communication nodes, and determine, when the included angle is greater than or equal to the preset threshold, that there is no LOS between the terminal and each of the plurality of communication nodes.

18. The apparatus as claimed in claim 17, wherein the preset threshold is configured by a positioning server according to a requirement of a positioning service, and the positioning server is further configured to add the preset threshold to auxiliary information, and send the auxiliary information to the terminal via an interface between the positioning server and the terminal.

\* \* \* \* \*